Sept. 21, 1943.  L. T. SCHAKENBACH  2,329,944
METHOD FOR SECURING IN PLACE RADIATING FINS AND THE LIKE
Filed Aug. 14, 1942  4 Sheets-Sheet 1

INVENTOR.
BY LESLIE T. SCHAKENBACH,
Ward, Crosby & Neal
ATTORNEYS

Sept. 21, 1943.  L. T. SCHAKENBACH  2,329,944
METHOD FOR SECURING IN PLACE RADIATING FINS AND THE LIKE
Filed Aug. 14, 1942  4 Sheets-Sheet 2
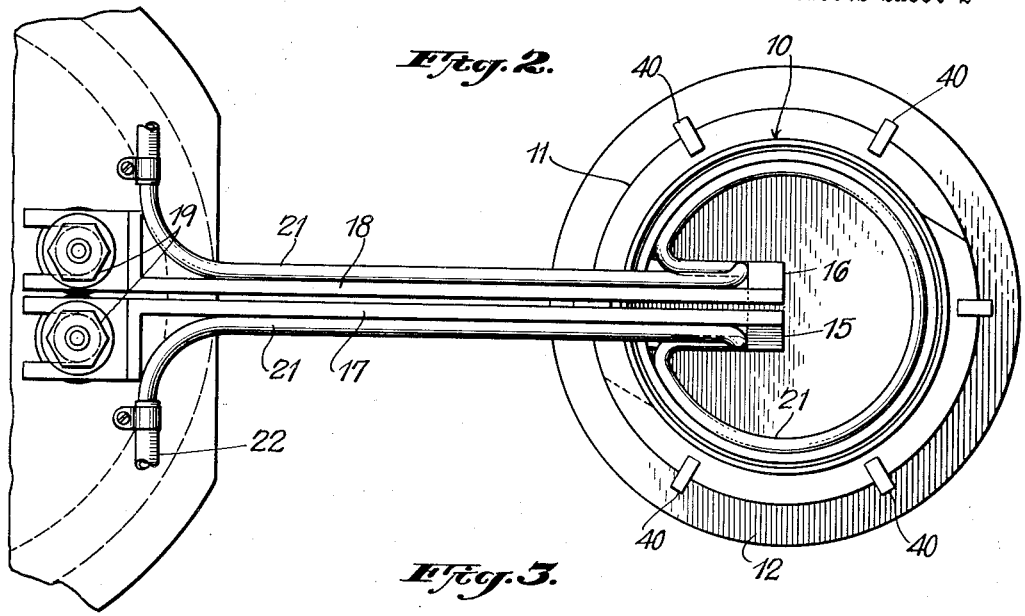

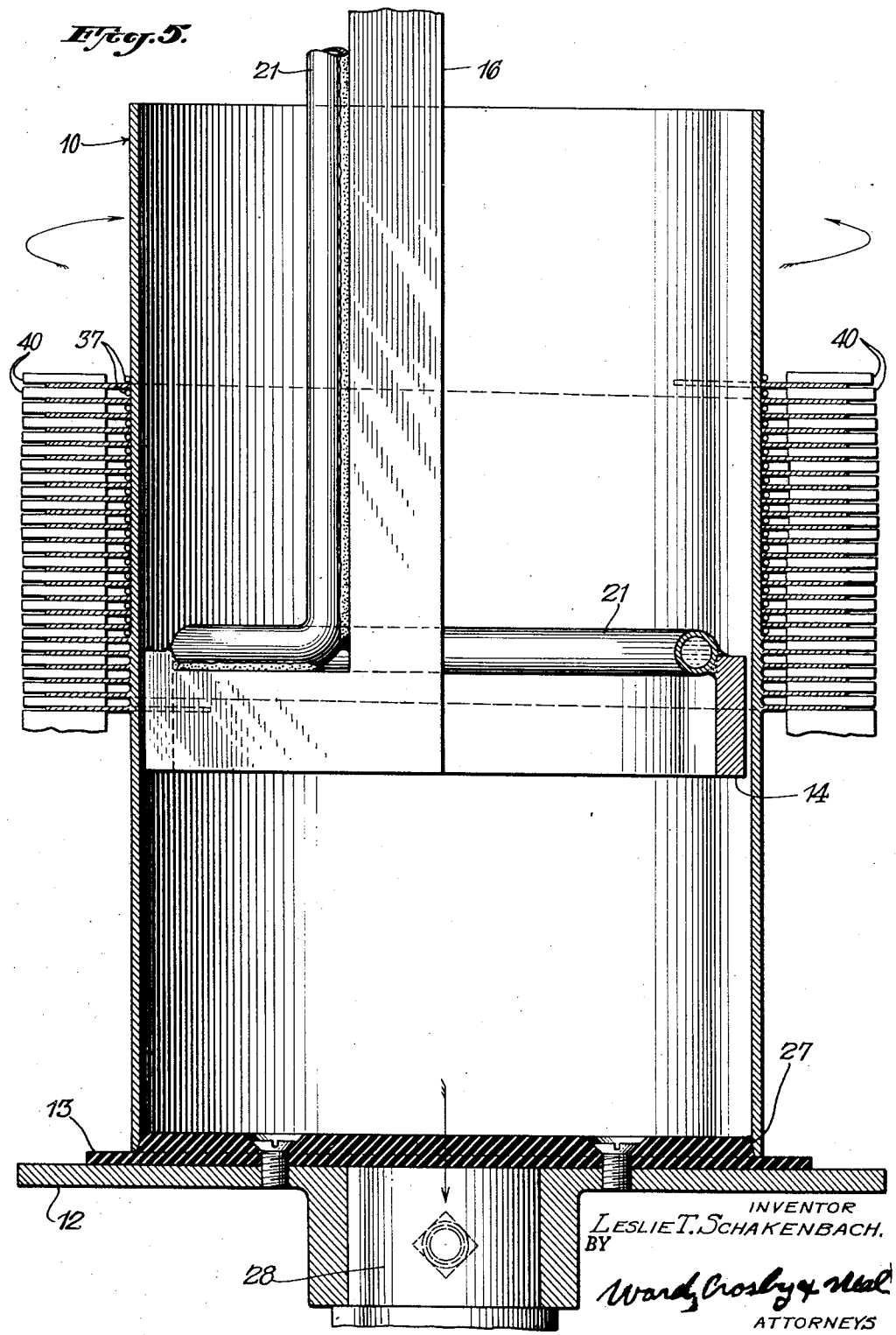

Sept. 21, 1943.  L. T. SCHAKENBACH  2,329,944
METHOD FOR SECURING IN PLACE RADIATING FINS AND THE LIKE
Filed Aug. 14, 1942  4 Sheets-Sheet 4
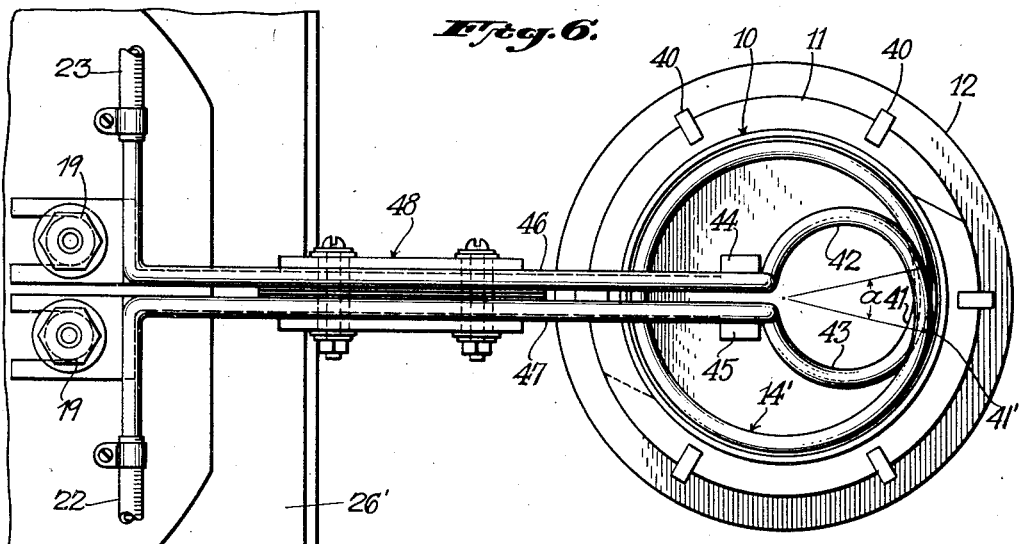
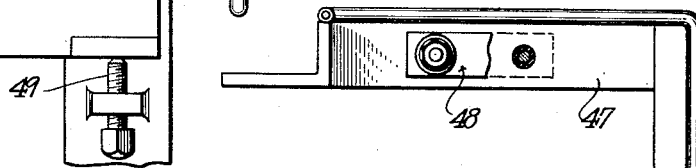
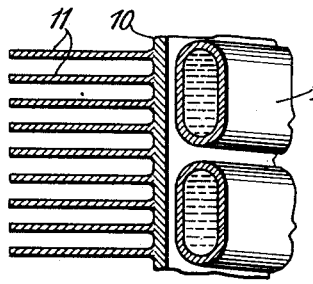
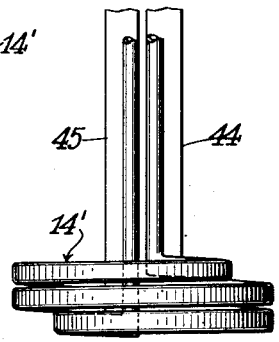
INVENTOR.
LESLIE T. SCHAKENBACH.
BY
Ward, Crosby & Neal
ATTORNEYS Patented Sept. 21, 1943

2,329,944

UNITED STATES PATENT OFFICE 2,329,944

METHOD FOR SECURING IN PLACE RADIATING FINS AND THE LIKE

Leslie T. Schakenbach, Forest Hills, N. Y., assignor to Induction Heating Corporation, New York, N. Y., a corporation of New York Application August 14, 1942, Serial No. 454,786

4 Claims. (Cl. 219—12)

This invention relates to methods for heating tubular members, such as cylinders, internally by electromagnetic induction for purposes of soldering or brazing to the exterior of the member, parts such as radiating fins and the like, and for performing if desired at the same time, heat-treating operations on the walls of the tubular member.

Cylinders such as used for airplane engines, for example, have relatively thin steel walls which if subjected to high temperature heating operations, as for the above indicated purposes, are subject to prohibitive warping. The problem of soldering or brazing radiating fins in place on such cylinders is also particularly difficult since to provide adequate radiation, the fins must be very closely spaced and must protrude out to a substantial distance, thus rendering it impossible to gain access to the base edges of the fins to perform the brazing or soldering operation in any customary manner. It is also substantially impossible to apply heat externally of the cylinder by induction for this purpose, since it is usually desired to make the fins of a good heat conductive metal, such as copper, which not being magnetic and having no hysteresis effects, cannot be readily or quickly heated by induction heating. In fact, the fins or other external parts, if made of the usual metals affording high heat conductivity, will act as a shield, practically preventing high frequency inductive heating even of the steel cylinder if it is attempted to apply the heat externally, as by placing the assembly in an induction furnace.

The present invention wholly overcomes the above noted difficulties through the use of novel apparatus and methods for applying inductive heating internally of the tubular member or cylinder. Thus in the case of the problem of soldering radiating fins or other external parts on a cylinder, instead of applying heat directly to the solder and the two surfaces which are to be soldered together, as in the usual soldering operation, the heat instead is applied to the opposite or internal surface of the steel cylinder, which in turn heats the solder and the metal of the fins largely or wholly by conduction. By the use of this invention, successive sections along the cylinder may be progressively heated and cooled to the desired degree and with such uniformity of heating about the cylinder that no appreciable warping occurs. Radiating fins may thereby be quickly and economically soldered in place around the cylinder with a high degree of uniformity of the soldering from place to place and without danger of melting or any serious warping of the fins. Accordingly it is believed that this invention makes possible for the first time the practical use of closely spaced radiating fins of high heat conductive metal soldered in place on engine cylinders, thereby making it possible to avoid the expensive, time-consuming method now in general use of forming such fins by machining the cylinder casting or forging and avoiding the waste of metal and other difficulties which occur where the fins are made integral with the cylinder.

Various further and more specific objects, features and advantages of the invention will appear from the description given below taken with the accompanying drawings illustrating by way of example certain preferred forms of the invention.

In the drawings:

Fig. 2 is a top view showing portions of the upper part of the apparatus of Fig. 1;

Fig. 3 is an enlarged sectional view of a portion of a cylinder wall with radiating fins thereon, this figure also illustrating certain preliminary steps of the method of the invention;

Fig. 4 is a view similar to Fig. 3, but illustrating the fins as finally soldered in place;

Fig. 5 is a vertical sectional view of a cylinder with radiating fins and also showing various parts of the apparatus of the invention in position for carrying out the novel method;

Fig. 6 is a top view similar to Fig. 2, but illustrating another embodiment of the apparatus;

Fig. 7 is a view similar to Fig. 4, but illustrating portions of such other embodiment of the apparatus in use; and Figs. 8 and 9 respectively are elevational views taken at right angles to each other and showing in further detail an induction heating coil of the type used in the apparatus of Fig. 6.

Figure 1:
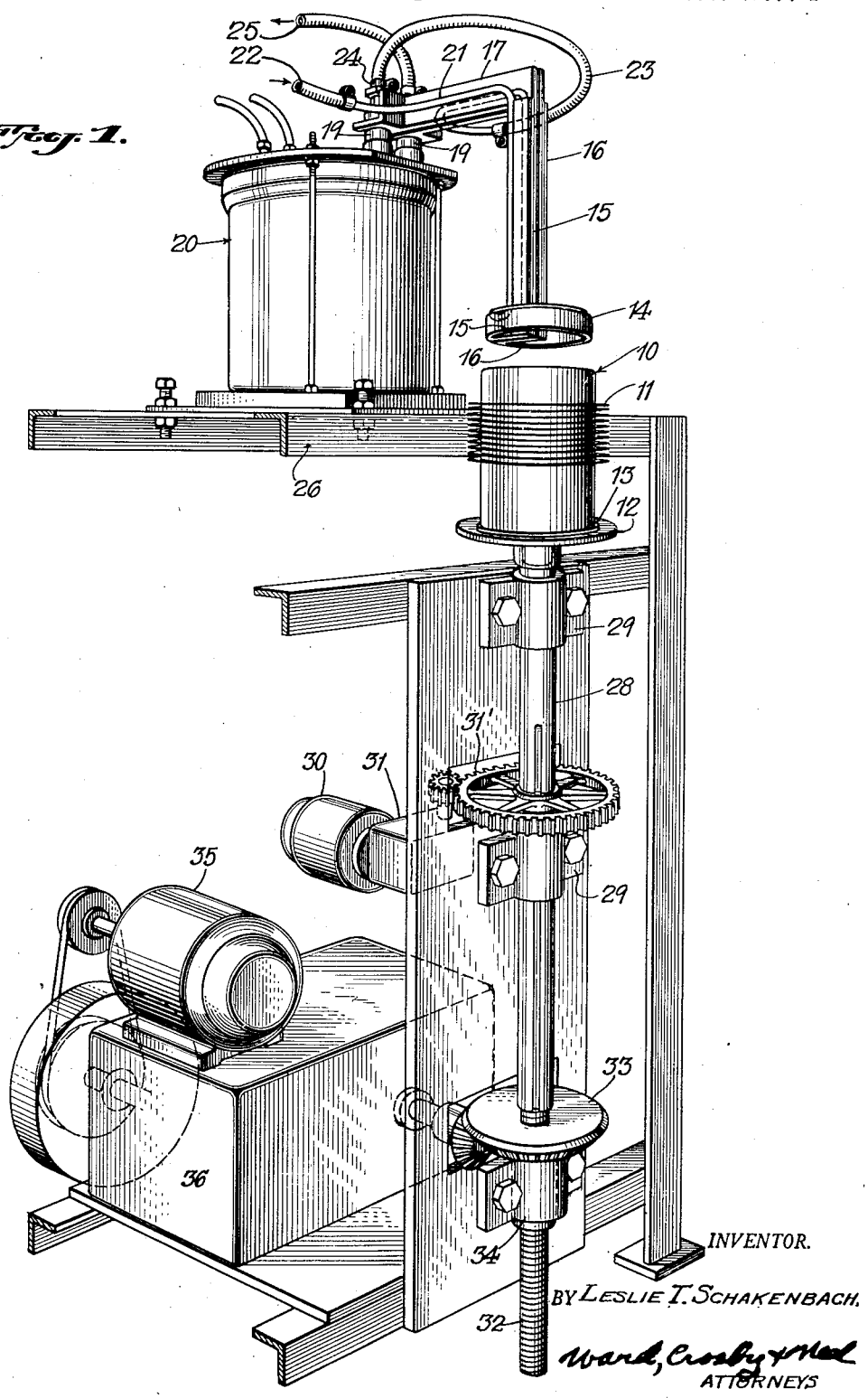
Fig. 1 is a perspective view of a preferred form of apparatus embodying the invention.

In Fig. 1 a cylinder 10 is shown embraced by a plurality of radiating fins 11, which have been soldered in place on the cylinder by the use of the invention. Such fins may comprise rings of thin sheet metal embracing the cylinder and formed of copper or other metal of good heat conductivity. If desired, the fins may initially be in the form of segments, such as semi-circular portions soldered in place. Also if preferred, the fins may comprise one continuous helical piece suitably fitted on to the cylinder and soldered in place along the base edges of the fins.

All these forms of fins will be referred to as substantially annular.

The cylinder 10 is shown supported on a turntable 12 having a layer of suitable heat resistant insulating material 13 on its upper surface. Suitable apparatus, one example of which is hereinafter described, is provided for rotating the turntable 12 and at the same time moving the table at a predetermined or adjustable rate axially of the cylinder.

A coil at 14 may comprise either one turn, or a relatively small number of turns as in an embodiment hereinafter described, and is provided for the application of the high frequency magnetic flux to the interior walls of the cylinder, as the cylinder rotates and also advances axially relative to the position of the coil. As shown in Fig. 1, the single coil turn may be formed by cutting off a section of a copper cylinder, for example, and by cutting a gap in the resulting circular piece at the point where the two ends of the turn are to be formed. These two ends of the turn may be soldered to a pair of L-shaped copper members as at 15, 16 (Figs. 1, 5). The horizontal portions of these members in effect serve to continue the two ends of the turn respectively inwardly toward the axis of the coil, whereas the vertical portions of the L-shaped members serve as conductors for carrying high frequency current to the coil. At the same time the members 15, 16 may serve as supports for rigidly suspending the coil in its desired position concentric with the moving cylinder. The upper ends of the members 15, 16 respectively may be suitably connected to conductor bars as at 17, 18 running to secondary terminals 19 of a high frequency transformer 20, the bars 17 and 18 also serving if desired to support the coil structure and attached parts.

In order to provide effective rapid heating, it is desirable to supply current to the induction heating coil at an extremely high frequency for example of the magnitude of 400,000 cycles per second, with a peak voltage on the coil for example in the neighborhood of 400 volts, the power supplied with the particular apparatus shown being of the magnitude of 20 kilowatts. Hence to prevent the coil structure and connected parts from reaching a high temperature and melting, it is necessary to apply cooling fluid thereto. In the form shown in Figs. 1 and 2, this is accomplished by soldering a cooling fluid conduit 21 of copper for example along the supporting conductors 15—18 and along the turn of the coil. This conduit as soldered in position thus has a highly effective heat conductive and electrical conductive relationship with the coil turn and its connections, so that the latter in practical effect embody a continuous series of communicating cavities for circulating cooling fluid, such as water, therethrough. As shown in Figs. 1 and 2, the water may be introduced as through a hose 22 of insulating material connected to a suitable source of supply. Also if desired the water after passing through the conduit 21 may be conducted as by a hose 23 into one of the transformer secondary terminals as at 24 for passage through the secondary and thence to a discharge pipe 25 passing out from the other secondary terminal.

The supporting and conductor assemblies 15, 17 and 16, 18 are preferably arranged in closely spaced relationship as shown, in order to minimize the inductance therebetween. Otherwise it would be difficult or impossible for the desired amount of high frequency power to reach the heating coil. Vertical portions of the members 15, 16 preferably extend upwardly along the line of the axis of the coil so that they will be as remote as possible from the cylinder to be heated and thus have little or no heating effect, and particularly no unsymmetrical heating effect thereon. Also to minimize unsymmetrical heating effects around the circumference of the coil, the gap at the two ends of the turn should be as small as possible and the cooling fluid conduit 21 should preferably as shown be soldered on to the turn and on to the conductors so as to be in a position as remote as possible from the walls of the cylinder to be heated, while still offering adequate cooling to all parts of the coil and its supports.

It is desirable to support the induction heating coil as accurately as possible concentrically with the cylinder to be heated, since variations in the coupling between the coil and the walls of the heated member as small as 1/64 inch, may very materially change the degree of heating. The heating effect decreases approximately as the square of the coupling distance. And if the cylinder walls are heated on one side to a substantially higher temperature than other areas around the cylinder, very serious difficulties of warping of the cylinder or melting of the fins may occur. However, since with the example of the invention shown in Figs. 1 and 2, the cylinder is preferably rotated during the heating operation, the amount of heating will be symmetrical at all points about the cylinder, so that accurate centering of the coil in the cylinder is not of vital importance with this example. Also relative rotation of the coil and cylinder about the cylinder axis substantially eliminates any lack of symmetrical heating due to there being a difference in the amount or position of the flux at the region of the gap between the two end portions of the coil turn. This latter factor, if not corrected, or if the coil and cylinder are not relatively rotated, will cause particularly serious warping of the cylinder due to uneven heating.

As shown in Fig. 1, the high frequency transformer 20 may be rigidly bolted in place on a platform as at 26 so that the induction heating coil and its supporting and connecting parts as carried by the transformer terminals, will be rigidly suspended in the desired position. According to another embodiment of the invention hereinafter described, provision is made for accurately adjusting the position of the transformer and the coil supported thereby.

As above stated and as more clearly shown in Fig. 5, the turntable 12 may be provided on its upper surface with an insulation member 13 upon which the cylinder may rest. If desired, this member may be recessed at its periphery as at 27 to provide an inner raised insulation area for fitting the lower inside edge of the cylinder and thereby insuring that the cylinder when put in place will be concentric with the axis of the turntable and the coil.

The means for rotating and vertically moving the turntable may of course assume a variety of forms. In the form shown in Fig. 1, the turntable is mounted upon a shaft 28 rotatable and movable vertically in bearings as at 29. A motor 30 for rotating the shaft may be connected thereto through suitable reduction gearing as at 31 and a gear 31' which is keyed to the shaft but slidable thereon. The lower end of the shaft may be threaded as at 32, this portion extending through a bevel gear 33 correspondingly threaded internally, which gear may be rotatably mounted in a bearing 34. A motor 35 may be connected through variable speed reduction gearing contained in the housing 36 to drive the gear 33. It will be apparent that if this gear is driven by the motor 35 at the same speed that the motor 30 drives the shaft 28, then the turntable 12 will rotate but remain at a constant elevation. But by decreasing or increasing the speed of drive of the gear 33, it will be apparent that the turntable may be either elevated or lowered while it is at the same time being rotated.

The manner in which the apparatus may be operated for soldering radiating fins in place on a cylinder will now be explained. The parts to be soldered should first be carefully made free of grease. As shown in Fig. 3, strips of solder, or a length or lengths of wire solder, may be placed between the fins on the exterior surface of the cylinder, adjacent or at the base edges of the fins. A silver solder widely available and well known in the trade under the name of "Easy Flo" has been found satisfactory for this purpose. Thereupon a small amount of a suitable flux as at 38 may be applied as by a nozzle 39, on the solder and along the inner or base edges of the fins. A well-known silver solder flux paste comprising sodium fluoride has been found satisfactory for this purpose. After the soldering flux has thus been applied, a series of superposed metal spacing members as at 40 may now be inserted between the fins as shown in Fig. 5 and preferably at a plurality of points around the cylinder for maintaining the fins at the desired positions during the actual soldering operation. The cylinder is then placed in position on the turntable as shown in Fig. 5, and with the turntable elevated to a position such that the coil 14 within the cylinder will be at the level preferably of the lowermost fins. The high frequency current is then applied to the heating coil while the cylinder is being rotated and lowered. Thus a relatively narrow band of the cylinder walls will be heated uniformly and as the cylinder is lowered, the areas bearing the higher fins will be progressively heated and cooled in succession. In the case of a well-known type of airplane engine cylinder, for example, and with the current, frequency and power, of the magnitudes above mentioned, excellent results in soldering fins in place may be obtained by rotating the cylinder at a speed of about one revolution in 12 seconds, while the cylinder is lowered at the rate of one foot in 9 minutes. The cylinder may preferably, however, at first be kept at a constant elevation for about one minute with the parts in positions as shown in Fig. 5, and thereafter lowered at the rate of about one inch per minute until the upper fins have been carried down past the region of the coil. Under these conditions with the apparatus here described, about 6 or 8 of the fins at a time will be heated red hot, but only for a short period, and the successively heated sections of the cylinder quickly reach a maximum external temperature for example of about 1350° F., which is adequate to melt the above mentioned solder having a melting point of about 1147° F. If desired, the heat may be applied to the region of the upper fins, as well as of the lower fins, for a slightly longer period to insure careful soldering of the end fins.

The above mentioned solder on being melted, with the aid of the flux and capillary action, is drawn in between the base edges of the fins and the outer surface of the cylinder, and also the solder forms fine uniform fillets as shown in Fig. 4 along the bases of the fins. As soon as the heating effect progresses to the next higher sections of the cylinder, the edges of the fins and the section of the cylinder which has been heated, will quickly cool sufficiently to allow the solder to solidify without running from the positions as shown in Fig. 4.

It has been found important to start the soldering operation with the lowermost fins rather than the uppermost, since in the latter case, considerable troublesome running of the solder downwardly from fin to fin will occur. On the other hand, this trouble is wholly avoided by starting at the lowermost fins and then lowering the cylinder (or raising the coil) so as to successively heat the solder at higher fins. Apparently if the flux and solder are first heated at the higher fins, the flux at the somewhat lower fins will aid the downward flow of the solder sufficiently to cause it to run down and accumulate to a troublesome degree. But by heating the lower regions first, the flux thereon is eliminated and hence is no longer available to aid downward flow of solder when melted at the higher fins.

Care should be taken not to heat the above mentioned solder much higher than the maximum temperature above given, because higher temperatures will tend to cause the solder and flux to form bubbles. Of course, by using a greater amount of high frequency power, the speed of relative movement of the coil and cylinder may be increased. Also substantially the same degree of heating may be secured by using less power and a slower speed of movement. Furthermore, the amount of power used which may be readily determined by trial, will also of course depend upon the size and thickness of the cylinder walls and the parts to be soldered thereto, and also upon the kind of solder used and the degree of heating which it requires.

With the embodiment of invention shown in Figs. 6–9, an induction heating coil 14' is used, having several turns, for example three turns as shown. Also if desired, as shown, these turns may be formed solely of a piece of coiled copper tubing which thus not only forms the electrical conductor of the turns, but also carries the stream of cooling water.

As shown in Fig. 7, the turns of tubing forming the coil may be closely spaced and preferably somewhat flattened in a direction along the circumference of the coil, whereby a considerable surface area of each coil turn may be brought into very close coupling relationship to the inside cylinder walls. By using a coil of several turns, the interruption in the field of flux or variations in such field due to the gap in a single turn coil, are to a considerable extent avoided. Accordingly, in many cases, if the coil having several turns is carefully centered with respect to the inside walls of the tubular member to be heated, the field of flux about the coil will be sufficiently uniform so that it will be unnecessary to relative rotate the coil and cylinder.

To further insure uniformity of the flux about a coil of several turns, the two end portions of the coil conductor, i. e., the end portions of the first and last turns, may be bent in a manner best shown in Fig. 6. That is, at points somewhat spaced along the circumference of the coil, for example, a spacing represented by the angle $a$, these two end portions as at 40, 41 start to gradually diverge inwardly from the circumference of the coil, but continue in an effectively overlapped relationship until they are spaced far enough from the cylinder walls to have little further heating effect. They may then be bent more abruptly as at 42, 43 so as to converge toward the center of the coil for connection to the supporting conductors. With this arrangement there will of course be an increased amount of flux in the region on that side portion of the coil where the two end portions overlap. However, this increase is compensated for, so far as concerns its effect outside the circumference of the coil, by reason of the fact that the overlapping end portions of the turn are gradually spaced more and more inwardly of the circumference. The exact curvature which the end portions of the turn should take for securing substantially uniform heating in adjacent regions of the cylinder may readily be determined by trial after inspection of the curvatures as shown in Fig. 6. The end portions should be brought around into converging relationship toward the center of the coil as rapidly as mechanical considerations will permit so as to minimize induction therebetween.

The same metal tubing of which the turns of the coil and its end portions are made, if desired may be continued upwardly in closely spaced relation along the axis of the coil and thence to the high frequency transformer secondary. Preferably these portions of the tubing may be supplemented by additional rigid supporting conductor bars as at 44, 45, 46, 47 which may be brazed or soldered to the metal tubing in the relationships shown in Figs. 6, 8 and 9. To prevent relative vibration and movement of the bars 46 and 47, suitable insulated connecting means may be provided as at 48, the construction of which will be readily apparent from Figs. 6 and 9.

Since the arrangement of Figs. 6-9 may ordinarily be used without requiring the rotation of the cylinder to be heated, means should preferably be provided for accurately adjusting the position of the circumference of the coil 14' with respect to the position of the interior walls of the cylinder to be heated. For this purpose in order to avoid adjustment mechanisms and complications on the parts carrying high frequency, the supporting table 26' for the high frequency transformer may be adjusted in horizontal directions as desired by set screw arrangements such as at 49, 50. Thus the transformer and all of the parts supported thereby which carry the high frequency current, including the coil, may be adjusted in position as a unit. With this arrangement adjustments for test purposes may be made while the high frequency power is turned on and without any danger of altering the electrical characteristics of the high frequency circuit.

With both of the above described embodiments of the invention it will be noted that the heating effect at any one time is confined to a relatively narrow band or short section of the tubular member or cylinder, and due to the relative axial movement of the heated member and coil, and other features of the invention, successive sections of the member are progressively heated and cooled to a uniform degree around the cylinder as well as along the cylinder. This method has substantial advantages over any method involving attempts to heat the whole area at one time from an internal source. If such latter method were attempted, in the first place it would be difficult to provide from readily available sources of high frequency, sufficient power to heat the whole cylinder at one time and difficulties would be involved in conducting such an amount of high frequency power, without prohibitive losses, into the interior of the cylinder. Furthermore, due to differences in the amount of heat which would be radiated from the end portions of the cylinder as compared with its middle portion, and because of the shape of the field of force about a long coil, it would be difficult or impossible to heat all desired areas of the cylinder with a proper degree of uniformity.

In the appended claims the term "soldering" is intended to comprehend similar operations such as so-called brazing.

While the invention has been described in detail with respect to particular preferred examples, it will be understood by those skilled in the art after understanding the invention that various changes and modifications may be made without departing from the spirit and scope of the invention, and it is intended therefore in the appended claims to cover all such changes and modifications.

What is claimed as new and desired to be secured by Letters Patent is:

1. Method for soldering in place a series of closely spaced substantially annularly extending metal fins of substantially flat cross section which embrace a ferrous metal tubular member with the inner fin edges abutting the tubular member, comprising winding a strip or the like of solder extending annularly along and between the base portions of adjacent fins, applying solder flux along such strip and heating said member at the base of the fins to a temperature sufficient to cause the solder to enter by capillary action between the base edges of the fins and the exterior surface of the tubular member, the solder of such strip being sufficient in amount so that same also forms small fillets at each side of the base edge of each fin, said heating being effected by electromagnetic induction from a coil carrying alternating current, located inside said member and generally concentric therewith, while maintaining the member in a substantially upstanding position, and while moving the member and coil with respect to each other axially of the coil in a direction whereby the coil assumes progressively higher positions with respect to the interior of the member, to cause progressive heating and cooling of said member in the region of a progressively advancing band, whereby the fins are soldered in place in succession from the lowermost to the highest.

2. Method for soldering in place a series of closely spaced substantially annularly extending metal fins of substantially flat cross section which embrace a ferrous metal tubular member with the inner fin edges abutting the tubular member, and for also heat treating the inner walls of such member, comprising winding a strip or the like of solder extending annularly along and between the base portions of adjacent fins, applying solder flux along such strip and heating said member at the base of the fins to a temperature sufficient to cause the solder to enter by capillary action between the base edges of the fins and the exterior surface of the tubular member, the solder of such strip being sufficient in amount so that same also forms small fillets at each side of the base edge of each fin, said heating being effected by electromagnetic induction from a coil positioned around inside of said member, and carrying alternating current of a frequency sufficiently high to subject the inner walls of said member to the desired heat treating while subjecting the external walls to a lesser temperature for melting the solder, maintaining the member in a substantially upstanding position during such heating, and also moving the member and coil with respect to each other axially of the coil in a direction whereby the coil assumes progressively higher positions with respect to the interior of the member, to cause progressive rapid heating and cooling of said member in the region of a progressively advancing band, whereby the fins are soldered in place in upward succession.

3. Method for soldering in place a series of closely spaced metal fins applied to the exterior of a ferrous metal tubular member with the inner fin edges abutting the tubular member, and for also heat treating the inner walls of the member, comprising applying a strip or the like of solder extending along and between the base portions of adjacent fins, applying solder flux along such strip and heating said member at the base of the fins to a temperature sufficient to cause the solder to enter by capillary action between the base edges of the fins and the exterior surface of the tubular member, said heating being effected by electromagnetic induction from a coil positioned around inside of said member, and carrying alternating current of a frequency sufficiently high to subject the inner walls of said member to the desired heat treating while subjecting the external walls to a lesser temperature for melting the solder, maintaining the member in a substantially upstanding position during such heating, and also moving the member and coil with respect to each other axially of the coil in a direction whereby the coil assumes progressively higher positions with respect to the interior of the member, to cause progressive heating and cooling of said member in the region of a progressively advancing band.

4. Method for soldering in place a series of closely spaced substantially annularly extending metal fins which embrace a ferrous metal tubular member with the inner fin edges abutting the tubular member, comprising winding a strip or the like of solder extending annularly along and between the base portions of adjacent fins, applying solder flux along such strip and heating said member at the base of the fins to a temperature sufficient to cause the solder to enter by capillary action between the base edges of the fins and the exterior surface of the tubular member, said heating being effected by electromagnetic induction from a coil carrying high frequency alternating current, positioned around the inside of said member and having its turn cross section elongated longitudinally of the inner wall surface of the member and closely spaced in respect thereto, while maintaining the member in a substantially upstanding position, and while moving the member and coil with respect to each other axially of the coil in a direction whereby the coil assumes progressively higher positions with respect to the interior of the member, to cause progressive rapid heating and cooling of said member in the region of a progressively advancing band, whereby the fins are soldered in place in upward succession.

LESLIE T. SCHAKENBACH.